United States Patent
Peterson et al.

(10) Patent No.: US 9,978,070 B1
(45) Date of Patent: May 22, 2018

(54) DYNAMIC CUSTOMER RELATIONSHIP MANAGEMENT WHILE MAINTAINING CUSTOMER PRIVACY

(71) Applicant: Amazon Technologies, Inc., Reno, NV (US)

(72) Inventors: Robert David Peterson, Redmond, WA (US); Andrew Sean Tyra, Seattle, WA (US); John Christopher Mikula, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 665 days.

(21) Appl. No.: 14/306,701

(22) Filed: Jun. 17, 2014

(51) Int. Cl.
*G06Q 30/00* (2012.01)
*G06Q 30/06* (2012.01)

(52) U.S. Cl.
CPC ......... *G06Q 30/01* (2013.01); *G06Q 30/0615* (2013.01)

(58) Field of Classification Search
CPC .................... G06Q 30/01; G06Q 30/0615
USPC ........................................................ 705/26
See application file for complete search history.

(56) References Cited

U.S. PATENT DOCUMENTS

| | | | | |
|---|---|---|---|---|
| 2002/0133392 | A1* | 9/2002 | Angel | G06F 17/3089 705/7.39 |
| 2009/0037287 | A1* | 2/2009 | Baitalmal | G06F 21/128 705/27.1 |
| 2009/0307683 | A1* | 12/2009 | Gharabally | G06F 8/65 717/173 |
| 2009/0327296 | A1* | 12/2009 | Francis | G06F 17/30 |
| 2011/0060905 | A1* | 3/2011 | Stack | G06Q 10/10 713/167 |
| 2011/0314366 | A1* | 12/2011 | Parker, III | G06Q 10/10 715/221 |
| 2014/0067473 | A1* | 3/2014 | Nienstedt, Sr. | G06Q 90/00 705/7.32 |

OTHER PUBLICATIONS

New Ways to Reach Customers, Taylor, Dave; Terhune, Alyse. InformationWeek: 377. United Business Media LLC. (Sep. 27, 1999).*

* cited by examiner

*Primary Examiner* — Michael Misiaszek
*Assistant Examiner* — Latasha Ramphal
(74) *Attorney, Agent, or Firm* — Lee & Hayes, PLLC

(57) ABSTRACT

Functionality is disclosed herein for providing messages specified by a third party to customers of an electronic marketplace while maintaining customer privacy. An occurrence of a customer relationship management event configured by a third party is detected and a message is provided to one or more customers of an electronic marketplace. Actions of customers of the electronic marketplace might be tracked that relate to the message. Analytics may also be provided to a third party while maintaining customer privacy.

20 Claims, 9 Drawing Sheets

DYNAMIC CUSTOMER RELATIONSHIP MANAGEMENT WHILE MAINTAINING CUSTOMER PRIVACY

BACKGROUND

Businesses might employ customer relationship management ("CRM") strategies for managing customer relationships. For example, a software company might employ CRM strategies to learn about customers who purchase a software product from them, to retain customers, to generate new business from customers and to increase profitability. Some of these CRM strategies might include contacting customers of the software provider. For example, the software provider might contact a customer when the customer purchases a software product, when a new version of a software product is available, or for some other reason.

In some cases, however, a software provider might not know how to contact its customers. For example, a software provider may sell software products at an online electronic marketplace that is owned and operated by a different entity. While the software provider might be able to sell software products on the electronic marketplace, they might not have access to information that is maintained by the electronic marketplace. For instance, the software provider might not have access to the customer information for the customers who have purchased one of their software products at the electronic marketplace. Instead, the electronic marketplace might maintain this customer information without providing access to the customer information to other entities. In many cases, the customers of an electronic marketplace do not want their personal information shared with other companies, such as software providers. In other cases, the electronic marketplace might not want to share the customer information.

In view of the above, it may be difficult for a software provider to contact customers who have purchased their software product from an electronic marketplace, or some other third party seller. For example, a software provider might not be able to send information (e.g., new customer communications, upgrade offers) to customers of the electronic marketplace. The disclosure made herein is presented with respect to these and other considerations.

DETAILED DESCRIPTION

Figure 1:
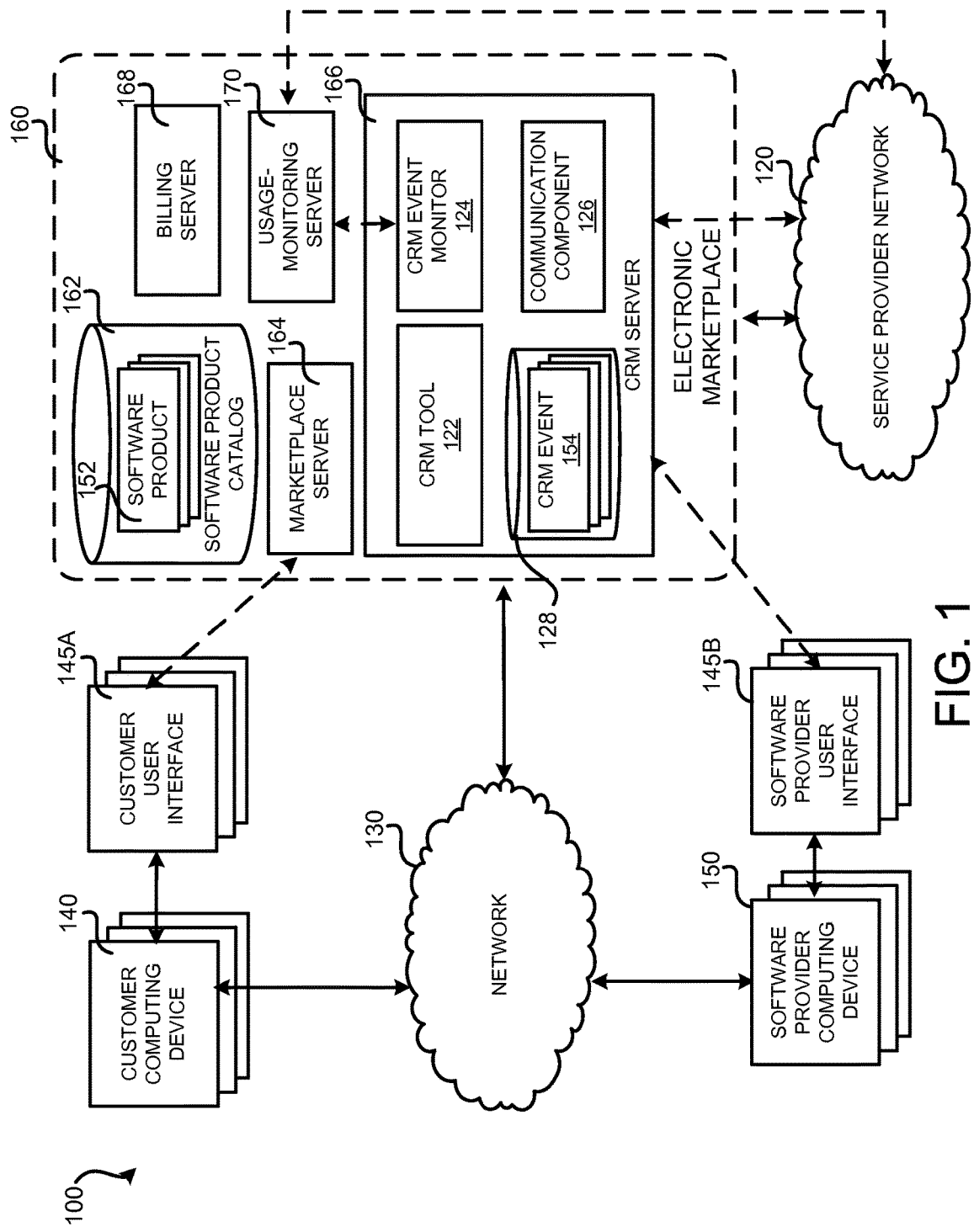
FIG. 1 is a block diagram depicting an illustrative operating environment in which a third party, such as a software provider, may define CRM events that when triggered send messages to customers of an electronic marketplace while the privacy of the customers is maintained.

The following detailed description is directed to technologies for performing CRM activities, such as sending messages specified by a third party to customers of an electronic marketplace, while maintaining customer privacy. In one example, a software provider defines different CRM events that are used to determine when to send messages to one or more customers of an electronic marketplace. Generally, the CRM events are associated with a software product that the software provider has made available for acquisition on an electronic marketplace. The CRM events might relate to a new customer event, a usage event (e.g., low or high usage), a configuration event, an upgrade event, a custom event, and possibly other types of events. As used herein, the term "software product" refers to software and/or software services. For example, a software product may be an application, a machine image, or software as a service ("SaaS"). The software product may be available from an electronic marketplace and may be executed on a service provider network.

In response to detecting an occurrence of a CRM event (e.g., at an electronic marketplace), a message relating to the event is provided to one or more customers of the electronic marketplace. The message includes content that might be specified by the software provider, or some other third party. Instead of the software provider obtaining customer information from the electronic marketplace in order to contact customers that have acquired one of their software products, the electronic marketplace sends messages on behalf of the software provider.

The CRM events might relate to different types of events that relate to a customer of the electronic marketplace. Some CRM events, include but are not limited to a new customer event, a usage event, a configuration event, an upgrade event (e.g., a new version of a software product is available), a custom event, and the like. For example, the new customer event might be used by a software provider to deliver a welcome message to the new customer when they purchase one of their software products from the electronic marketplace. The welcome message might include a variety of different content, such as how to configure the software product, help information relating to the software product, contact information for the software provider, and the like.

The occurrence of an upgrade event might trigger a software provider to notify customers of a new version or feature of the software product being released on the electronic marketplace. The message that is sent in response to detecting an occurrence of the upgrade event might include a variety of different content, such as how to obtain the upgraded software product, how to transition to using the upgraded software product, help information relating to the upgraded software product, and the like.

The occurrence of a usage event might trigger a software provider to send messages relating to the use of a software product. For example, a message might be sent to a customer of the electronic marketplace when the usage of the software product falls below a specified threshold (e.g., a low usage event that indicates no or little use in three days). A message might also be sent to a customer when the usage of the software product by the customer is above a specified threshold (e.g., a high usage event such as executing eight instances of a standard version of the software product at the same time). The message that is sent in response to detecting the occurrence of a usage event might include a variety of different types of content, such as information indicating how to contact the software provider for assistance in the configuration and use of the software product, how to obtain a version of the software product that better matches the needs of the customer, help information relating to the software product, and the like.

The occurrence of a configuration event might trigger a software provider to send messages relating to how to configure a software product for use. For example, a configuration event might be detected in response to determining that one or more configuration settings are not set correctly or that a configuration setting might be set differently in order to obtain better performance from the software product. The message that is sent in response to detecting a configuration event might include a variety of different types of information, such as information describing how to contact the software provider for assistance in configuring the software product, help information relating to the software product, and the like.

A custom event might also be defined in order to send messages in response to the occurrence of other monitored conditions that are configured by the software provider. For example, a custom event might be defined to send a message when a security issue is detected with a software product. The message that is sent in response to detecting an occurrence of a custom event, such as a security event, might include a variety of different types of information, such as how to obtain a fix for a security issue, how to configure the software product, how to contact the software provider, and the like.

In one example, the manner in which delivery of messages is made to the customers of the electronic marketplace is configurable. For instance, a number of messages sent by the electronic marketplace on behalf of the software provider might be limited (e.g., one communication per day or month). The different messages might also be prioritized. For example, messages relating to security events might be delivered to customers whenever a security event is detected, whereas a message relating to an upgrade event might be limited to once every six months. The software provider might configure different CRM events and associated messages that are sent in response to detecting a CRM event.

A CRM event and message content might be defined by a software provider, or some other user, using a CRM tool, such as a user interface, provided by the electronic marketplace. In one example, a software provider uses the CRM tool to set different options and parameters relating to one or more CRM events and to specify message content that is included in the messages that are delivered to customers of the electronic marketplace in response to the occurrence of the CRM events. In one example, the different options and parameters relate to information that is monitored by the electronic marketplace and/or a service provider network. For instance, the information might include configuration information for a software product or usage information of a software product as well as customer information maintained by the electronic marketplace. Some example options that might be defined when defining a CRM event include, but are not limited to a usage time of the software product, a type of virtual machine instance utilized to execute the software product, a number of virtual machine instances utilized, an amount and type of computing resources requested, and the like. Other configuration options for a CRM event might be based on other usage information, configuration information and customer information.

Analytics relating to actions performed by customers of the electronic marketplace in response to receiving a message generated in response to the occurrence of a CRM event might also be provided to the software provider, or some other third party. The analytics might be displayed in a graphical user interface ("GUI"), stored in a document, emailed, or provided in another manner to a user. The analytics may be kept up to date in real or near real time. For example, when the analytics are presented, the information that is included in the analytics may be the latest analytics currently available from the electronic marketplace. The analytics might also include aggregated results that relate to one or more software products that are available on the electronic marketplace. In one example, the analytics are anonymized such that the analytics do not include personally identifiable information ("PII") before the analytics are provided to the third party. Additional details regarding the various components and processes described above for sending messages configured by a third party to customers of an electronic marketplace while maintaining customer privacy will be presented below with regard to FIGS. 1-9.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances and the like. As mentioned briefly above, the embodiments described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a block diagram depicting an illustrative operating environment 100 in which a third party, such as a software provider, may define CRM events 154 that when triggered send communications to customers of an electronic marketplace while the privacy of the customers is maintained. As illustrated in FIG. 1, the operating environment 100 includes one or more software provider computing devices 150, one or more customer computing devices 140 in communication with an electronic marketplace 160 and service provider network 120 via a network 130, such as a wide area network. An independent software vendor ("ISV"), or some other software provider, using a software provider computing device 150, may submit via the network 130 software products 152 (e.g., virtual machine images) to the electronic marketplace 160. The electronic marketplace 160 may then make the submitted software products 152, as well as other software products 152 submitted to the electronic marketplace 160, available to customers. As used herein, the terms "customer" and "customers" refer to existing customers of the electronic marketplace 160 as well as visitors (i.e. potential customers) to the electronic marketplace 160.

A customer may access the electronic marketplace 160 to browse and acquire software products 152 (e.g., through a purchase or free trial) made available in the electronic marketplace 160 by the ISVs, other software providers, or the operator of the electronic marketplace 160. As used herein, a "purchase" of a software product may result in a one-time payment from a customer or may result in payments from a customer that are made on an ongoing basis depending upon how the software is utilized and executed. In one example, a purchase of a software product establishes a subscription to the software product that allows the customer to execute the software product at a specified usage fee. The specified usage fee may be based on different factors such as the amount of time the software product is executed, a number or type of resources used by the software, a number of operations performed by the software product, and the like.

A customer, using a customer computing device 140 and the customer user interface 145A, may select and purchase a software product 152 from the electronic marketplace 160. After selecting the software product 152, the customer may configure the software product 152 and launch the software product 152 in a service provider network 120 that is operated, maintained, provided or otherwise associated with the operator of the electronic marketplace 160.

As described in more detail below, the service provider network 120 may include a collection of rapidly provisioned and, potentially, released computing resources hosted in connection with the marketplace or a third party provider. The computing resources may include a number of computing, networking and storage devices in communication with one another. In some embodiments, the computing resources may correspond to physical computing devices. In other embodiments, the computing resources may correspond to virtual machine instances implemented by one or more physical computing devices. In still other embodiments, computing resources may correspond to both virtual machine instances and physical computing devices.

As discussed briefly above, the software provider computing devices 150 and the customer computing devices 140 may communicate with the electronic marketplace 160 via a network 130. A software provider computing device 150 or the customer computing devices 140 may be any computing device, such as a laptop or tablet computer, personal computer, server, personal digital assistant ("PDA"), hybrid PDA/mobile phone, mobile phone, electronic book reader, set-top box, camera, digital media player, and the like. The network 130 may be any wired network, wireless network or combination thereof. In addition, the network 130 may be a personal area network, local area network, wide area network, cable network, satellite network, cellular telephone network, or combination thereof. In the illustrated embodiment, the network 130 is the Internet.

In the illustrated embodiment, the electronic marketplace 160 is illustrated as a computing environment including several computer systems that are interconnected using one or more networks. More specifically, the electronic marketplace 160 may include a marketplace server 164, a usage-monitoring server 170, an electronic software product catalog 162 including software products 152, a CRM server 166, and a billing server 168. Each of these will be described in more detail below.

It should be appreciated that the electronic marketplace 160 may have fewer or more components than are illustrated in FIG. 1. For example, while the electronic marketplace 160 is shown separately from the service provider network 120, the electronic marketplace 160 and all or a portion of the components illustrated in the electronic marketplace 160 may be provided by the service provider network 120. As another example, the usage-monitoring server 170 may be located within the service provider network 120. In addition, the electronic marketplace 160 could include various Web services and/or peer-to-peer network configurations. Thus, the depiction of the electronic marketplace 160 in FIG. 1 should be taken as illustrative and not limiting to the present disclosure.

The marketplace server 164 facilitates submission of software products 152 by ISVs, or other software providers and browsing and acquisition by customers of software products offered through the electronic marketplace 160. Accordingly, a software provider such as an ISV, utilizing a software provider computing device 150 and a software provider user interface 145B, may submit one or more software products 152 to the electronic marketplace 160 via the marketplace server 164. The submitted software products 152 may then be included in an electronic software product catalog 162. According to an embodiment, the electronic marketplace 160 and the service provider network 120 are operated and owned independently from the ISVs that submit the software products 152 for inclusion in the electronic marketplace 160.

The software product catalog 162 includes information on the software products 152 submitted from different ISVs and, potentially, on the software products 152 made available by the operator of the electronic marketplace 160. Accordingly, the marketplace server 164 may obtain software products from ISVs and make the software products available to a customer from a single network resource, such as a Web site. A customer may then acquire the software product 152 from the electronic marketplace 160 and launch the software product 152 in a hosted computing environment (e.g., the service provider network 120) in a single interaction or order placed with the electronic marketplace 160. According to another embodiment, the hosted computing environment may be a different network, such as a software provider network (not shown).

Illustratively, the marketplace server 164 may generate one or more user interfaces, such as a customer user interface 145A, through which a customer, utilizing a customer computing device 140, or some other computing device, may browse software products, submit queries for matching software products and view information and details regarding specific software products. A customer may also select one of the software products for a free trial or purchase using a customer user interface 145A.

A customer may or may not decide to purchase a software product 152. If a customer does select to purchase a software product 152, then the marketplace server 164 may facilitate the configuration and acquisition of the software product 152. In this regard, the marketplace server 164 may receive payment information from the customer computing device 140, as well as information specifying how a service provider network 120 should implement the software product 152. The marketplace server 164 may also establish an account or update an account for a customer.

The CRM server 166 is configured to provide functionality relating to defining and configuring CRM events 154 and message content, storing content relating to CRM events 154 and messages, sending messages to customers of the electronic marketplace 160 and providing analytics to a third party while maintaining customer privacy. As illustrated in FIG. 1, the CRM server 166 is one example of a CRM computing device that includes a CRM tool 122, a CRM event monitor 124, a communication component 126 and a data store 128 operative to store definitions of the CRM events 154. While the CRM tool 122, the CRM event monitor 124, the communication component 126 and the data store 128 are illustrated within the CRM server 166, all or a portion of these components may be located in other locations. For example, the data store 128 may be located externally from the CRM server 166 at some other location in the electronic marketplace 160. Similarly, the CRM event monitor 124 may be part of the usage-monitoring server 170, and the like.

The CRM tool 122 is configured to configure the CRM events 154 and modify the CRM events 154. For example, the CRM tool 122 may be used by a software provider, or some other user, to configure options for one or more CRM events 154. As discussed briefly above, a software provider might define CRM events 154, such as, but not limited to, a new customer event, a usage event, a configuration event, an upgrade event and a custom event. The CRM tool 122 might be a user interface that is provided by the electronic marketplace 160. In one example, a software provider uses the CRM tool 122 to set different options and parameters relating to one or more CRM events 154 and to specify message content that is included in the messages that are delivered to customers of the electronic marketplace 160.

In one example, the different options and parameters used in defining and configuring a CRM event 154 might relate to information that is monitored by the electronic marketplace 160 and/or a service provider network 120, or some other source. For instance, the monitored information might include configuration information for the software products 152, usage information for the software products 152 as well as customer information maintained by the electronic marketplace 160. Some example options that might be defined when configuring a CRM event 154 include, but are not limited to, a usage time of the software product 152, a type of virtual machine instance utilized to execute the software product 152, a number of virtual machine instances utilized, the amount and type of computing resources requested, and the like. Other configuration options for a CRM event 154 might be based on other types of usage information, configuration information and/or customer information. Generally, the parameters that are used in configuring a CRM event 154 may be any parameter that is monitored by the electronic marketplace 160 or the service provider network 120, or some other computing resource. In one example, the electronic marketplace 160 or the service provider network 120 monitors and stores configuration information for the software products 152, usage information for the software products 152 and customer information.

Figure 2:
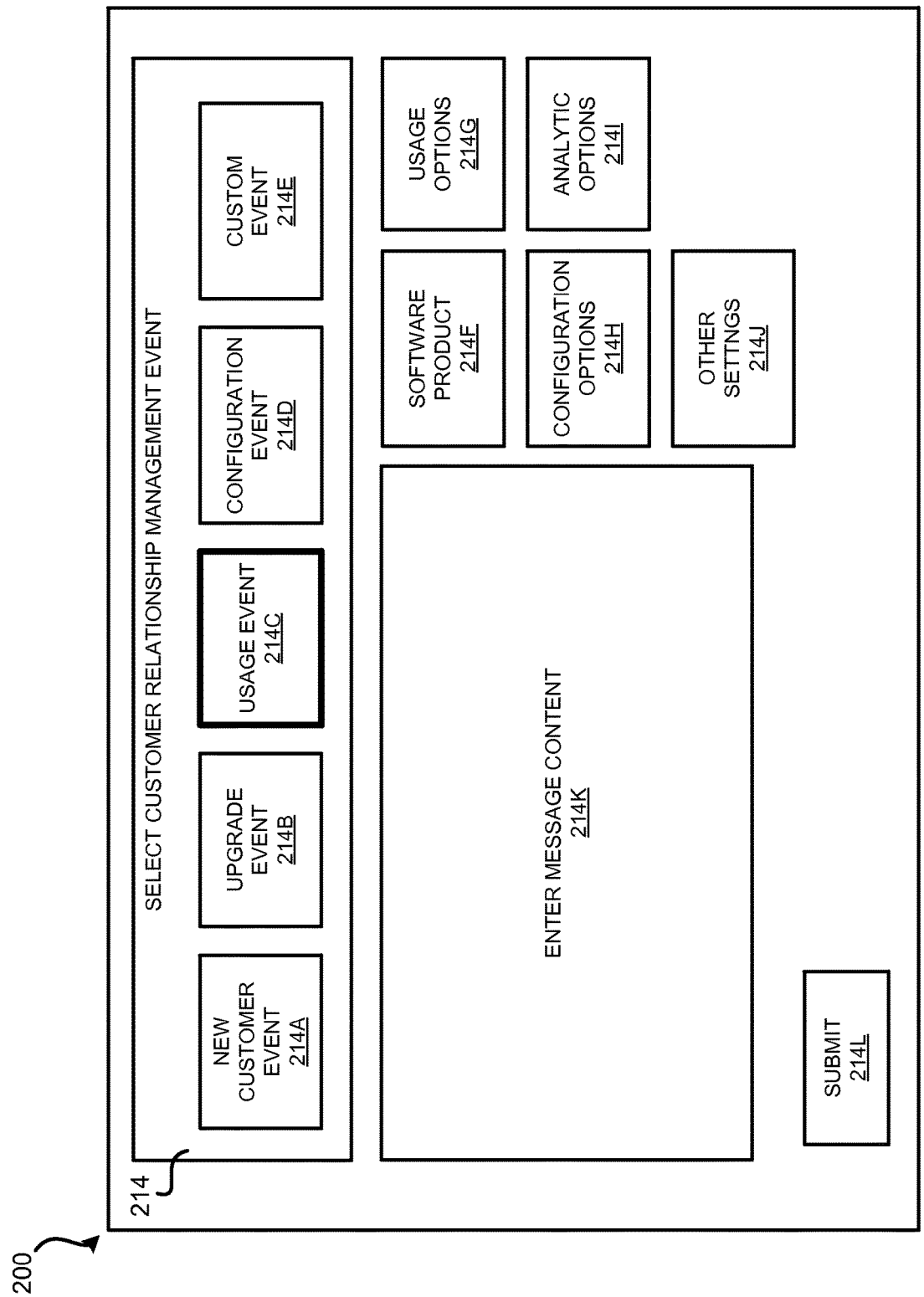
FIG. 2 illustrates a graphical user interface ("UI") that might be used to configure CRM events that are monitored by an electronic marketplace.

According to an embodiment, the software provider uses a software provider user interface 145B to define the CRM events 154. FIG. 2, which will be described in greater detail below, shows one non-limiting example of a user interface ("UI") 200 that might be utilized to configure the CRM events 154 and set options relating to analytics that are provided to a user. The CRM tool 122 might also present other options to the user when configuring a CRM event 154. For example, the options may include, but are not limited to, when to monitor for a CRM event 154, how often analytics are to be delivered, and the like. Some or all of these options may be configured by default.

The CRM tool 122 might include default CRM events 154 that may be selected by a user. The user might modify the CRM events 154 or use them as provided by the electronic marketplace 160. For example, the electronic marketplace 160 might provide default configurations for a new customer event, a usage event, a configuration event, and an upgrade. The software provider might select one of the default CRM events 154 that includes default message content and modify the default CRM event 154 based on the CRM strategies that the software provider employs. In some examples, the default message includes a selectable user interface element that may be used by a customer receiving the message to indicate whether the message was helpful or not. For instance, the message might include a "YES" UI element and a "NO" UI element. The responses received from the customers indicating whether the message was helpful or not as determined by the customers might be aggregated and provided to the software provider in a user interface, such as the user interface 300 shown in FIG. 3.

The CRM event monitor 124 included in the CRM server 166 is operative to detect an occurrence of a CRM event 154. For example, the CRM event monitor 124 may be configured to detect an occurrence of a new customer event configured by a software provider, such as when a customer of the electronic marketplace 160 purchases a software product 152 provided by the software provider. Similarly, in one example, the CRM event monitor 124 is also configured to detect an occurrence of usage events, configuration events, upgrade events and custom events.

The CRM event monitor 124 might also be configured to monitor information (e.g., configuration information or usage information) that is associated with the electronic marketplace 160 and/or the service provider network 120. The usage information and configuration information may come from the usage-monitoring server 170, the marketplace server 164, or from some other source. In the illustrated example, a usage-monitoring server 170 is in communication with the CRM event monitor 124 and the service provider network 120 and is operable to monitor usage of the functionality provided by a software product 152.

According to an embodiment, the usage information and configuration information is monitored for each software product 152 that is executed on the service provider network 120. The usage information that might be monitored may include information such as, but not limited to, usage time of a software product, a type of virtual machine instance utilized to execute a software product, a number of virtual machine instances utilized, the amount and type of computing resources requested, and the like. The configuration information might include information such as, but not limited to, a virtual machine instance type, use of other computing resources, as well as other configuration settings for software products 152.

The CRM server 166 might also monitor or obtain revenue and cost information that is associated with software products 152. For example, the CRM event monitor 124 may receive cost information from the billing server 168, or some other source. For example, the billing server 168 may provide revenue and cost information to the CRM event monitor 124 periodically or on demand. The costs might include both actual costs of executing the software product 152 on the service provider network 120, as well as fees that are charged to the customer. The billing server 168 may also be configured to process payments from customers and, in some embodiments, provide payment to the software providers of the software products.

The CRM event monitor 124 might also be configured to identify customers to receive a message in response to detecting an occurrence of a defined CRM event 154 that is associated with one or more software products 152. In one example, the CRM event monitor 124 is configured to provide the messages that are associated with the CRM events to the identified customers. The messages may be sent using different mechanisms (e.g., email, text, or Web page). Generally, any delivery mechanism may be used to provide a message to the identified customers of the electronic marketplace 160.

The CRM event monitor 124, in one example, is configured to track actions that are performed by customers of the electronic marketplace 160 in response to receiving a message that is associated with a CRM event 154. The actions that might be tracked generally relate to actions that might be performed by a customer in response to receiving a message. For example, the actions might include, but are not limited to, how many customers upgraded the software product in response to receiving a message that informs the customers that an upgraded version of a software product is available, how many customers changed a configuration of a software product in response to receiving a message sent in response to detecting a configuration event message, and the like. Information that relates to the tracked action may be stored in a data store, such as the data store 128.

The CRM event monitor 124, or some other computing resource, might also be configured to generate analytics relating to the tracked actions. In one example, the analytics are anonymized such that the analytics do not include personally identifiable information ("PII") before the analytics are provided to the third party. The analytics that are generated might include various types of information. For example, the analytics might include actions for the software product that is associated with a software product 152 (e.g., number of purchases of the software product 152) or aggregated information that relates to similar software products (e.g., number of purchases of similar software products 152 during a same time period) that are available on the electronic marketplace 160. The analytics might be used by a software provider or the electronic marketplace 160 to determine an effectiveness of a message that is sent to customers in response to detecting an occurrence of a CRM event 154. For example, the analytics might show that other software provider messages that are sent in response to detecting an occurrence of a configuration event are more effective in getting customers to change a configuration of the software product 152. In one example, any PII is removed from the analytics before they are provided to a third party.

The analytics may be provided by the communication component 126 to one or more different users (e.g., software providers). The analytics might be provided using different mechanisms. For example, and without limitation, the analytics may be displayed in a GUI, delivered in a document, transmitted via an email, and the like. In one example, the analytics are kept up to date in real or near real time. Additional details regarding sending communications specified by a third party to customers of an electronic marketplace 160 while maintaining customer privacy are provided below.

Figure 3:
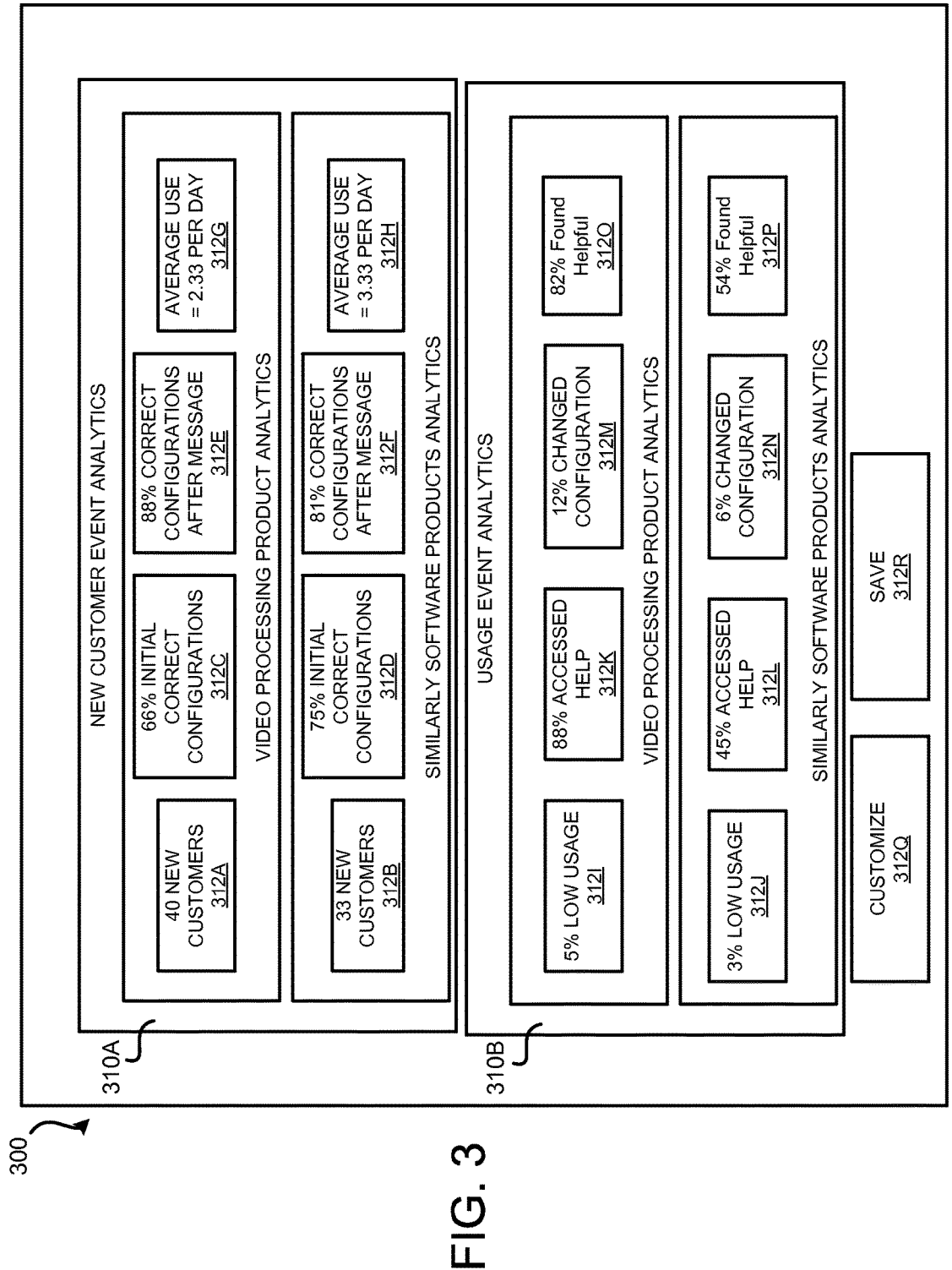
FIG. 3 illustrates a graphical user interface that presents analytics relating to actions taken by customers of an electronic marketplace in response to receiving a message sent in response to an occurrence of a CRM event.

Turning now to FIGS. 2-3, different examples of graphical user interfaces ("GUIs") are illustrated that might be used to configure CRM events 154 and display analytics relating to messages that are sent in response to an occurrence of CRM events. The GUIs that are presented are for illustrative purposes only, and are not intended to be limiting.

FIG. 2 illustrates a graphical user interface ("UI") 200 that might be used to define CRM events that are monitored by an electronic marketplace 160. As illustrated, the UI 200 shows different user interface elements relating to configuring a CRM event 154. The UI 200 might be generated by the marketplace server 164 or the CRM server 166 shown in FIG. 1, and presented on a computing device, such as a software provider computing device 150 by an application executing thereupon. For example, the application might be a web browser application.

As discussed above, a third party, such as a software provider to an electronic marketplace 160, might use a software provider user interface 145B to define and/or configure one or more CRM events 154. As illustrated in FIG. 2, a user, such as a software provider may configure five different CRM events 154 including a new customer event, an upgrade event, a usage event, a configuration event and a custom event. A CRM event 154 might be configured by selecting a new customer event 214A UI element, an upgrade event 214B UI element, a usage event 214C UI element, a configuration event 214D UI element or a custom event 214E UI element. For example, a software provider might select the usage event 214C element to configure CRM event options for a particular software product 152. A current CRM event 154 that is being configured might be displayed in a different manner during configuration. As illustrated, the usage event 214C UI element has been selected for configuration and is displayed with a thicker border as compared to the non-selected UI elements. While five different CRM events are shown, more or fewer CRM events might be configured in other embodiments.

The user may also specify message content using the input box 214K that is sent to one or more identified customers of the electronic marketplace 160 in response to an occurrence of the associated CRM event 154. In the current example, the user might create a usage message that is communicated to a user based on the configured options set to trigger the usage event. The message content might include a variety of different types of information, such as how to configure the software product, help information relating to the software product, contact information for the software provider, and the like. Generally, the message content is configured based on the CRM event 154 being configured. In one example, templates are provided (not shown) that might be used as the message content and/or modified by the user.

In one example, the user might configure different options relating to a CRM event 154. A user might specify different usage options (e.g., a time of use of the software product) by selecting the usage options 214G UI element. For example, the user might specify a usage event that relates to low usage of the product (e.g., no or little use in a specified period of time), a high usage of the product (e.g., use over a specified number of hours and/or use of a number of instances), or some other configured usage. The usage information used when configuring a CRM event 154 might include information such as, but not limited to, usage time of the software product, a type of virtual machine instance utilized to execute the software product, a number of virtual machine instances utilized, the amount and type of computing resources utilized, and the like.

The configuration options UI element 214H might be selected to associate different configuration parameters with a CRM event 154 being configured. The configuration information might include items such as, but not limited to, a virtual machine instance type, use of other computing resources, as well as other configuration settings for a software product 152. The analytic options 214I UI element might be selected to configure different analytics to monitor and set display options that relate to a CRM event 154.

FIG. 3 shows one example display of analytics that might be provided. In one example, the analytics that might be displayed may be selected from any information that is monitored by the electronic marketplace 160, the service provider network 120 or some other source. As discussed above, the monitored information might include configuration information, usage information and anonymized customer information.

The other settings 214J UI element might be used to set other parameters that are not displayed in the UI 200. For example, an equation editor might be included that allows a user to specify other parameters that are used to determine when a CRM event 154 is triggered. More or fewer UI elements might be included in other user interfaces.

When finished configuring a CRM event 154, the user configuring the CRM event 154 or the analytics reported for a CRM event 154 might select the submit button 214L to provide the configuration to the electronic marketplace 160. Many other types and configurations of user interfaces might also be provided.

FIG. 3 illustrates a graphical user interface 300 that presents analytics relating to actions taken by customers of an electronic marketplace 160 in response to receiving a message sent in response to an occurrence of a CRM event 154. The UI 300 may be generated by the CRM server 166, shown in FIG. 1, and presented on a computing device, such as the software provider computing device 150, by a web browser application execution thereupon, or another type of application.

As illustrated in FIG. 3, the UI 300 includes a display of analytics related to one or more CRM events 154. In the current example, the UI 300 includes a display of a new customer event analytics 310A and a display of the usage event analytics 310B. The analytics that are presented in the UI 300 might include various types of information. The analytics might include information relating to a particular software product 152 that is associated with a CRM event 154 or aggregated results that relate to similar software products 152 that are available on the electronic marketplace 160.

As can be seen by referring to the UI 300, the new customer event analytics 310A shows the UI elements 312A, 312C, 312E and 312G that relate to a video processing product that is associated with a new customer event and the UI elements 312B, 312D, 312F and 312H that show analytics for similar software products. The new customers UI element 312A shows that 40 new customers have purchased the video processing product within a specified time period (e.g., set when configuring the new customer CRM event or set when configuring a display of the analytics).

The initial correct configuration UI element 312C shows that 66% of the new customers have correctly configured the video processing product (e.g., as determined by configurations defined by a software provider). The correct configurations after message UI element 312E shows that 88% of the new customers have correctly configured the video processing product after receiving a message based on an occurrence of a CRM event. The message might be generated and sent in response to the new customer event and/or some other event, such as a configuration event. For example, a configuration message might be sent to the 34% of the customers who did not initially configure the software product correctly. In the current example, the software provider is able to see that the percentage of customers correctly configuring the product increases by 22% after viewing the message. The use UI element 312G shows that the new customers average 2.33 hours of use per day. As discussed herein, other analytics might be included in an analytics report. For example, analytics 310B also includes the helpful UI elements 312O and 312P.

The new customer event analytics 310A also shows the UI elements 312B, 312D, 312F and 312H that relate to similar video processing products that are available on the electronic marketplace 160. The new customers UI element 312B shows that 33 new customers have purchased a similar video processing product within the specified time period. The initial correct configuration UI element 312D shows that 75% of the new customers have correctly configured the similar video processing products. The correct configurations after message UI element 312F shows that 81% of the new customers have correctly configured the similar video processing products. The use UI element 312H shows that the new customers for similar software products average 3.33 hours of use per day. The analytics provided for the similar software products might be used by the software provider, or some other user, to determine an effectiveness of a message that is sent in response to an occurrence of a CRM event 154.

In the illustrated example, the software provider is able to see that it is selling more video processing software products as compared to other software providers that offer similar video processing products. The software provider is also able to see that it might need to improve initial instructions to configure the software product since customers of the similar software products configure its software products correctly a greater percentage of the time. The software provider is also able to see that after receiving a message relating to configuration that a greater percentage of the customers have configured the software product as compared to similar software products.

The UI 300 also shows analytics 310B for a usage event that is associated with the video processing product. The low usage UI element 312I shows that 5% of the customers who have purchased the video processing product have been detected to have low usage (e.g., as specified during the configuration of the usage event). The accessed help UI element 312K shows that 88% of the customers who received a low usage message have accessed help for the video processing product. The changed configuration UI element 312M shows that 12% of the customers who have received the low usage message change changed the configuration of the video processing product. The helpful UI element 312O shows that 82% of customers found the low usage message helpful. As discussed above, other analytics might be included in an analytics report.

The usage event analytics 310B also shows analytics for similar software products 152. The low usage UI element 312J shows that 3% of the customers who have purchased similar video processing products have been detected to have low usage. The accessed help UI element 312L shows that 45% of the customers who received a low usage message for similar video processing products have accessed help. The changed configuration UI element 312N shows that 6% of the customers who have received the low usage message for similar video processing products changed the configuration. The helpful UI element 312P shows that 91% of customers found the low usage message helpful.

In the illustrated example, the software provider is able to see that more customers access help and change the configuration of the software product after receiving a low usage message as compared to similar software products. The software provider is also able to see that many more of its customers find the low usage message helpful as compared to customers who purchased similar software products.

According to an embodiment, the analytics that are provided to the third party are anonymized such that the analytics provided to the third party do not include PII. As can be seen, the analytics that are shown in the UI 300 are aggregated. In another example, PII might be included in the analytics when a customer has given permission to provide PII to a particular software provider. For example, the customer of the electronic marketplace 160 might have an established relationship with the software provider.

A user might also select other user interface elements (not shown) to obtain other information that is related to a CRM event 154 (e.g., revenue information, configuration information or general usage information relating to a software product 152). In one example, the UI 200 might also provide functionality for setting options (not shown) relating to the delivery of the messages to the customers of the electronic marketplace 160. A user might prioritize or rank delivery of the different messages that are associated with CRM events 154. For example, messages relating to security events might be ranked first such that security messages are delivered immediately to customers whenever a security event is detected, whereas a message relating to an upgrade event might be ranked much lower.

A user, in one example, might also customize the UI 300 by selecting a customize UI element 312Q. In response to selecting the customize UI element 312Q, a user may then be prompted to select the different information that they would like to include in the display of the UI 300. For example, a user may select from a list (or some other UI element or input method) the information that they would like displayed (e.g., different analytics). In another example, the user may select how the information is to be displayed. For example, the user may request to have the information displayed as raw data, as a graphical representation (e.g., tables, charts, graphs), or in some other format.

The information presented in the UI 300 might also be saved (e.g., downloaded) for later use. As illustrated, a user may select a save button 312R to download the information to a local data store, a network data store, or to another location. The analytics may be downloaded in one or more formats. For example, a user may download all or a portion of the analytics as a text file, a spreadsheet file, a word-processing file, or some other file.

Figure 4:
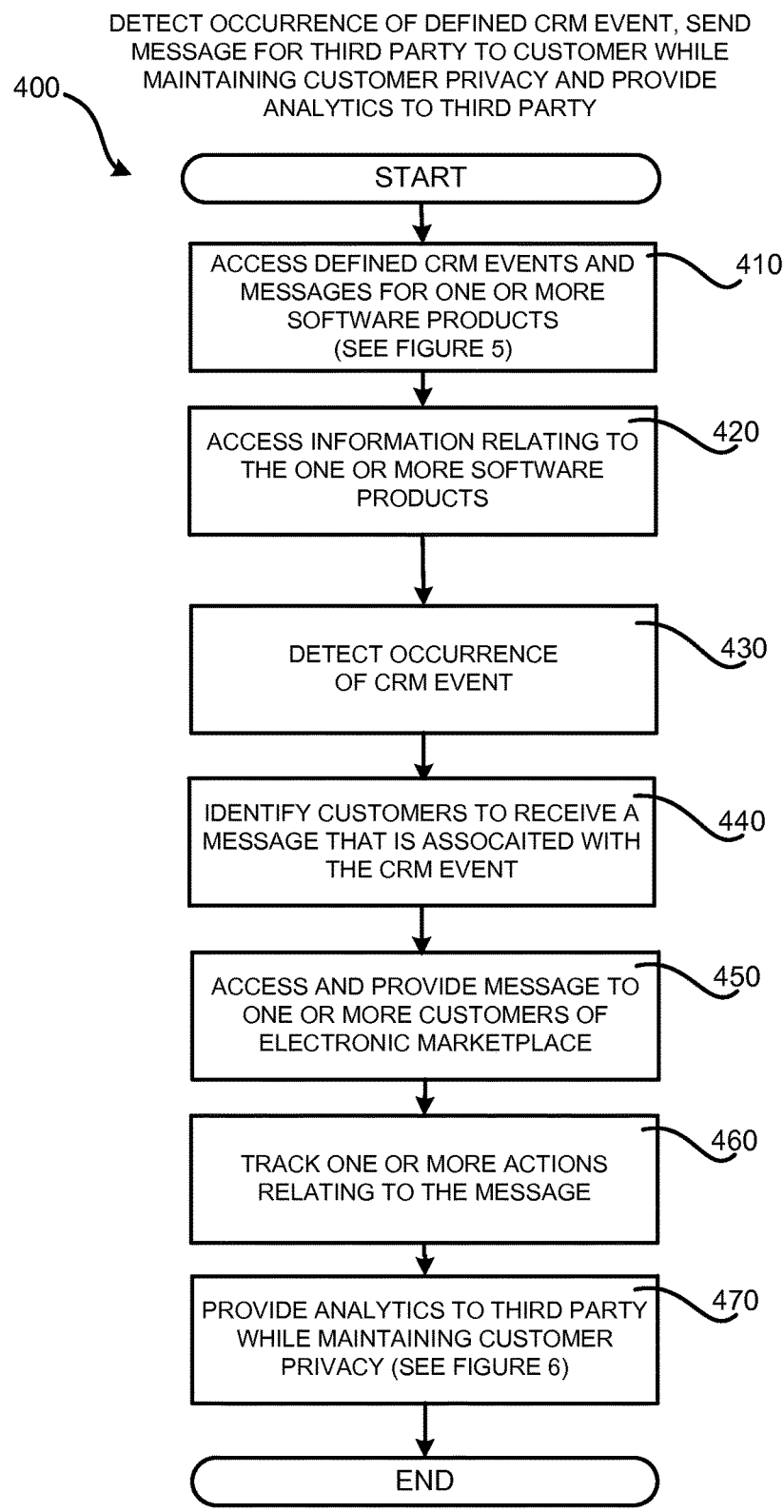
FIG. 4 illustrates a routine for sending messages configured by a software provider to customers of an electronic marketplace while maintaining customer privacy.
Figure 5:
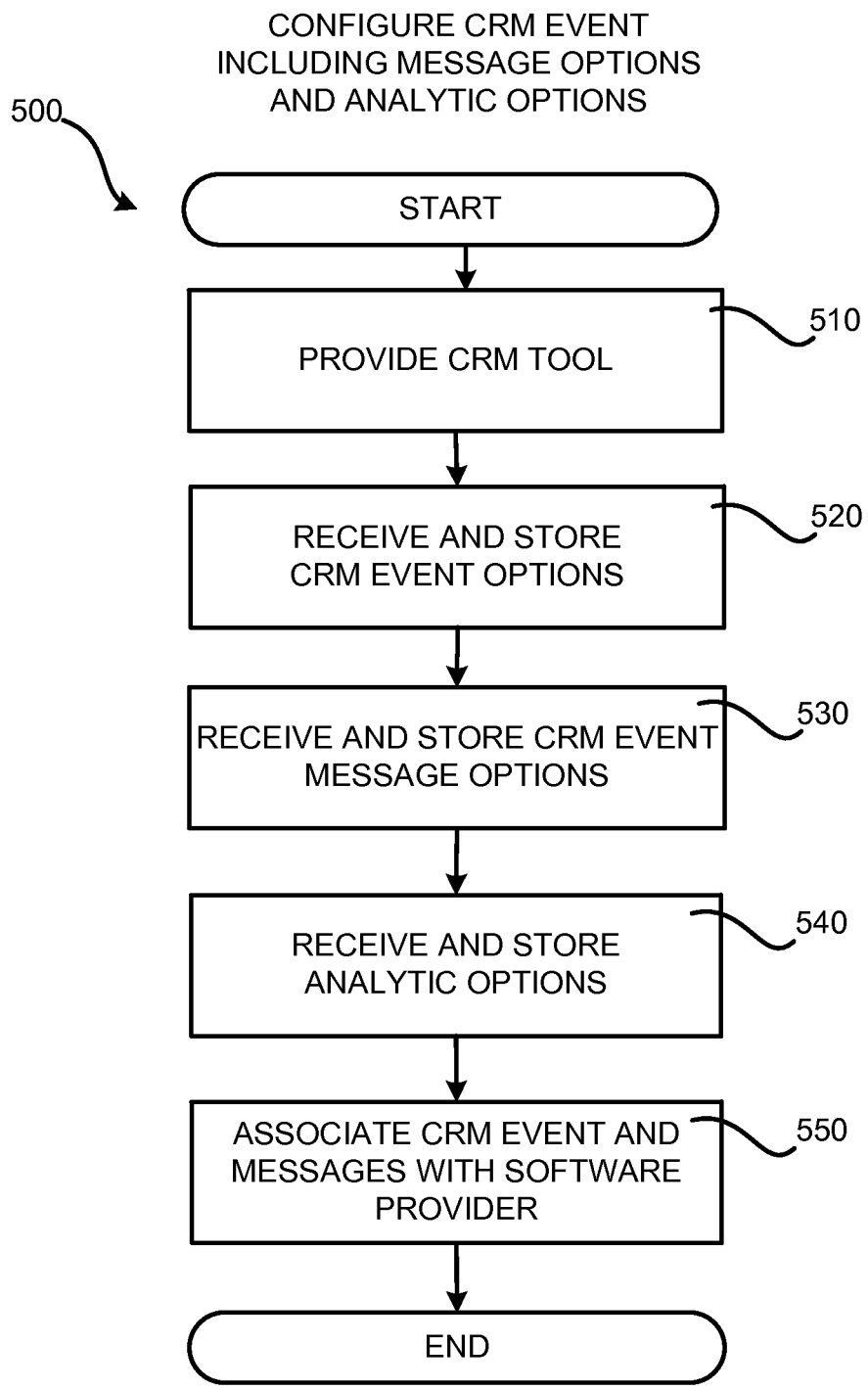
FIG. 5 illustrates a routine for defining a CRM event including content for a message and analytic options.
Figure 6:
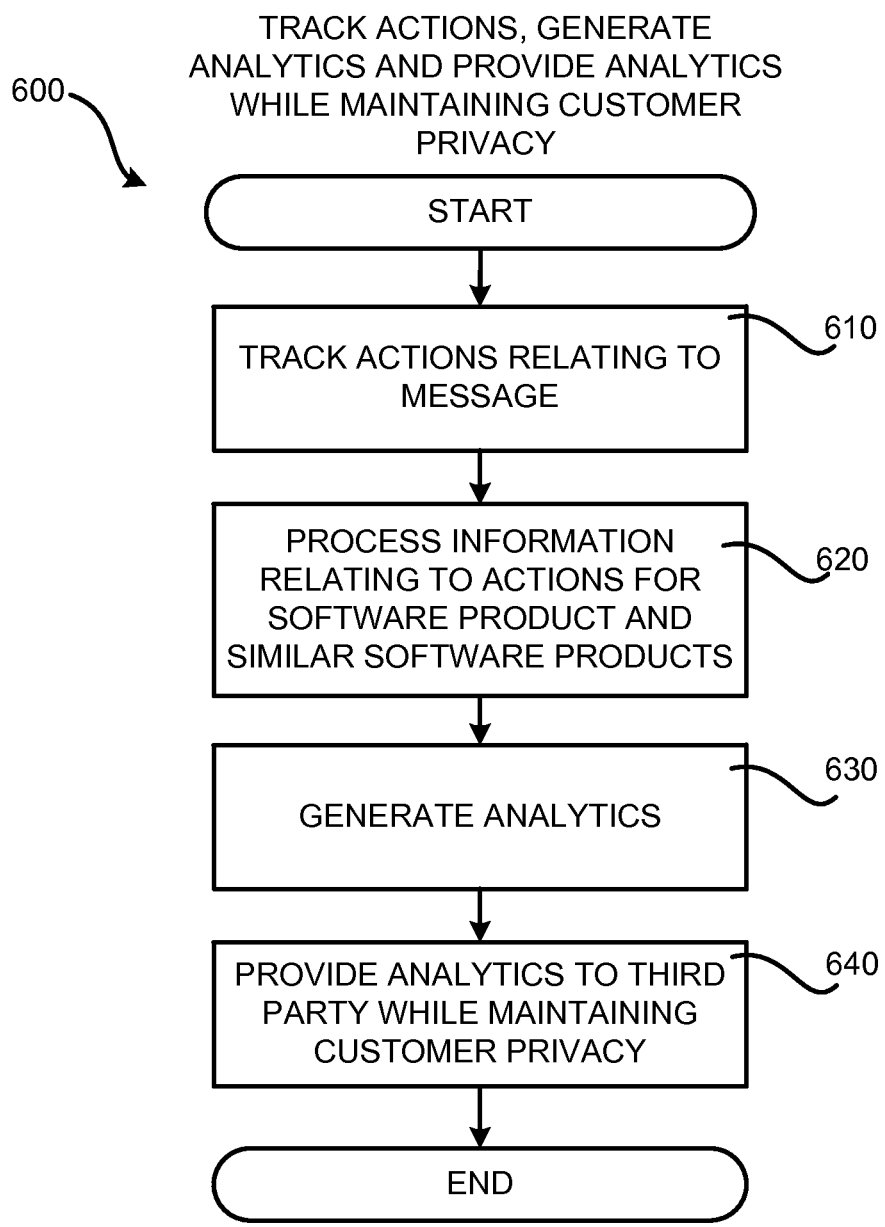
FIG. 6 illustrates a routine for tracking actions, generating analytics and providing analytics to a third party while maintaining customer privacy.

FIGS. 4-6 are flow diagrams showing routines that illustrate aspects of sending messages configured by a software provider to customers of an electronic marketplace while maintaining customer privacy, according to an embodiment disclosed herein. It should be appreciated that the logical operations described herein with respect to FIGS. 4-6, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic and any combination thereof. It should also be appreciated that more or fewer operations may be performed than shown in the FIGS. and described herein. These operations may also be performed in parallel, or in a different order than those described herein.

FIG. 4 illustrates a routine 400 for sending messages configured by a software provider to customers of an electronic marketplace 160 while maintaining customer privacy. The routine 400 begins at operation 410, where defined CRM events 154 for one or more software products 152 are accessed. As discussed above, a software provider of an electronic marketplace 160 might configure one or more CRM events 154 that are used to determine when to send a message to one or more customers of the electronic marketplace 160. In one example, the CRM events include a new customer event, a usage event, a configuration event, an upgrade event and a custom event. More or fewer CRM events 154 might be configured. FIG. 5 provides more details regarding the configuration of CRM events 154 and message content for the CRM events 154.

From operation 410, the routine 400 might proceed to operation 420, where information for a software product 152 is accessed. As discussed above, the information might include configuration information, usage information, and customer information that relates to the software product 152 that is associated with a CRM event 154. As discussed above, the configuration information might include items such as a virtual machine instance type, use of other computing resources, as well as other configuration settings for a software product 152. The usage information for the software products 152 might include information such as, but not limited to, usage time of the software product 152, a type of virtual machine instance utilized to execute the software product 152, a number of virtual machine instances utilized, the amount and type of computing resources utilized, and the like. Other information related to the software product 152 might also be accessed. For example, revenue information for purchases of the software product 152 might be accessed.

From operation 420, the routine 400 might proceed to operation 430, where an occurrence of a CRM event 154 is detected. As discussed above, different CRM events 154 may be configured, such as, but not limited to a new customer event, a usage event, a configuration event, an upgrade event and a custom event. In one example, a CRM event monitor 124 is configured to detect an occurrence of a CRM event 154.

From operation 430, the routine 400 might proceed to operation 440, where customers of the electronic marketplace 160 are identified to receive a message in response to detecting an occurrence of a CRM event 154. As discussed above, one or more customers of the electronic marketplace 160 might be identified. For example, a new customer event might relate to a single customer, whereas an upgrade event might relate to each of the customers of the electronic marketplace 160 that have purchased a software product 152 from a particular software provider.

From operation 440, the routine 400 might proceed to operation 450, where the identified customers of the electronic marketplace 160 are then provided with the message that is associated with a CRM event 154. As discussed above, a message may be provided using different mechanisms.

From operation 450, the routine 400 might proceed to operation 460, where one or more actions are tracked relating to the message. As discussed above, the actions that are tracked relate to one or more actions that might be performed by a customer in response to receiving a message. For example, the actions tracked for receiving a message in response to detecting an occurrence of an upgrade event might include tracking how many customers upgraded the software product 152.

From operation 460, the routine 400 might proceed to operation 470, where analytics are provided. The analytics might be provided to a software provider or some other user to a third party, such as a third party software provider that submits one or more software products 152 to an electronic marketplace 160. As discussed above, in one example, the analytics that are provided maintain the privacy of the customers of the electronic marketplace 160. For example, PII might not be included in the analytics that are displayed within a user interface, such as the UI 300. The analytics might include aggregated information that relates to the tracked actions. One example of how analytics might be provided is illustrated in FIG. 3 and described above. For example, and as mentioned above, the analytics may be provided using different mechanisms. For example, the analytics may be displayed in a GUI, delivered in a document, and the like. Additional details regarding the provision of analytics will be provided below with regard to FIG. 6.

From operation 470, the routine 400 then proceeds to an end operation. Alternately, the routine 400 might proceed back to repeat some or all of the processing operations described above. For example, from operation 470, the routine 400 may proceed back to operation 410.

FIG. 5 illustrates a routine 500 for configuring a CRM event 154 including content for a message and analytic options. The routine 500 begins at operation 510, where a CRM tool 122 might be provided. For example, and as described above, a software provider user interface 145B, such as the UI 200 shown in FIG. 2 might be used by a software provider to configure a CRM event 154. The UI 200 might be displayed in a webpage that is provided by the electronic marketplace 160 hosting the software product 152 or provided using a different mechanism.

From operation 510, the routine 500 might proceed to operation 520, where CRM event options are received and stored. As discussed above, the CRM event options are used to select the CRM events 154 that the software provider would like to use to initiate a message being sent to one or more customers of the electronic marketplace 160. A user might also configure CRM event options that are based on information that is maintained by the electronic marketplace 160 or the service provider network 120. For example, the CRM event options might be based on configuration information of a software product 152, usage information of the software product 152, customer information, and the like.

From operation 520, the routine 500 might proceed to operation 530, where message options might be configured by a user, such as a software provider of an electronic marketplace 160. As discussed above, the message options may include delivery options (e.g., email, text) as well as specifying content for the message that is associated with a CRM event 154. Generally, the content of the message relates to the type of CRM event 154.

From operation 530, the routine 500 might proceed to operation 540, where analytic options might be received and stored. As discussed above, a user might select one or more options that relate to analytics that might be provided to the user. For example, the user might use UI 200 to select the analytics that might be included when the analytics are provided to the third party.

From operation 540, the routine 500 might proceed to operation 550, where the configured CRM event options, the CRM message options, and the analytic options are associated with a software provider and/or one or more software products 152. From operation 550, the routine 500 might proceed to an end operation, return to operation 510, or return to some other operation illustrated in the routine 500.

FIG. 6 illustrates a routine 600 for tracking actions, generating analytics and providing analytics to a third party while maintaining customer privacy. The routine 600 begins at operation 610, where actions are tracked for customers of the electronic marketplace 160 that have received a communication. As discussed above, the actions might be tracked using different mechanisms.

From operation 610, the routine 600 might proceed to operation 620, where information that relates to the tracked actions is processed by the CRM server 166. As discussed above, the tracked actions might be processed to remove PII from the information. Other processing might also occur (e.g., normalizing data).

From operation 620, the routine 600 might proceed to operation 630, where analytics are generated. As discussed above, the analytics that are generated might include various types of information. For example, the analytics might include actions for the software product that are associated with a software product (e.g., number of purchases of the software product 152) or aggregated information that relates to similar software products (e.g., number of purchases of similar software products 152 during a same time period) that are available on the electronic marketplace 160.

From operation 630, the routine 600 might proceed to operation 640, where the analytics are provided to a third party, such as a software provider, while maintaining customer privacy. As discussed above, the analytics might be provided using different mechanisms. For example, the UI 300 illustrated in FIG. 3 provided by the electronic marketplace 160 might be used to display the analytics. The routine 600 then proceeds to an end operation.

Figure 7:
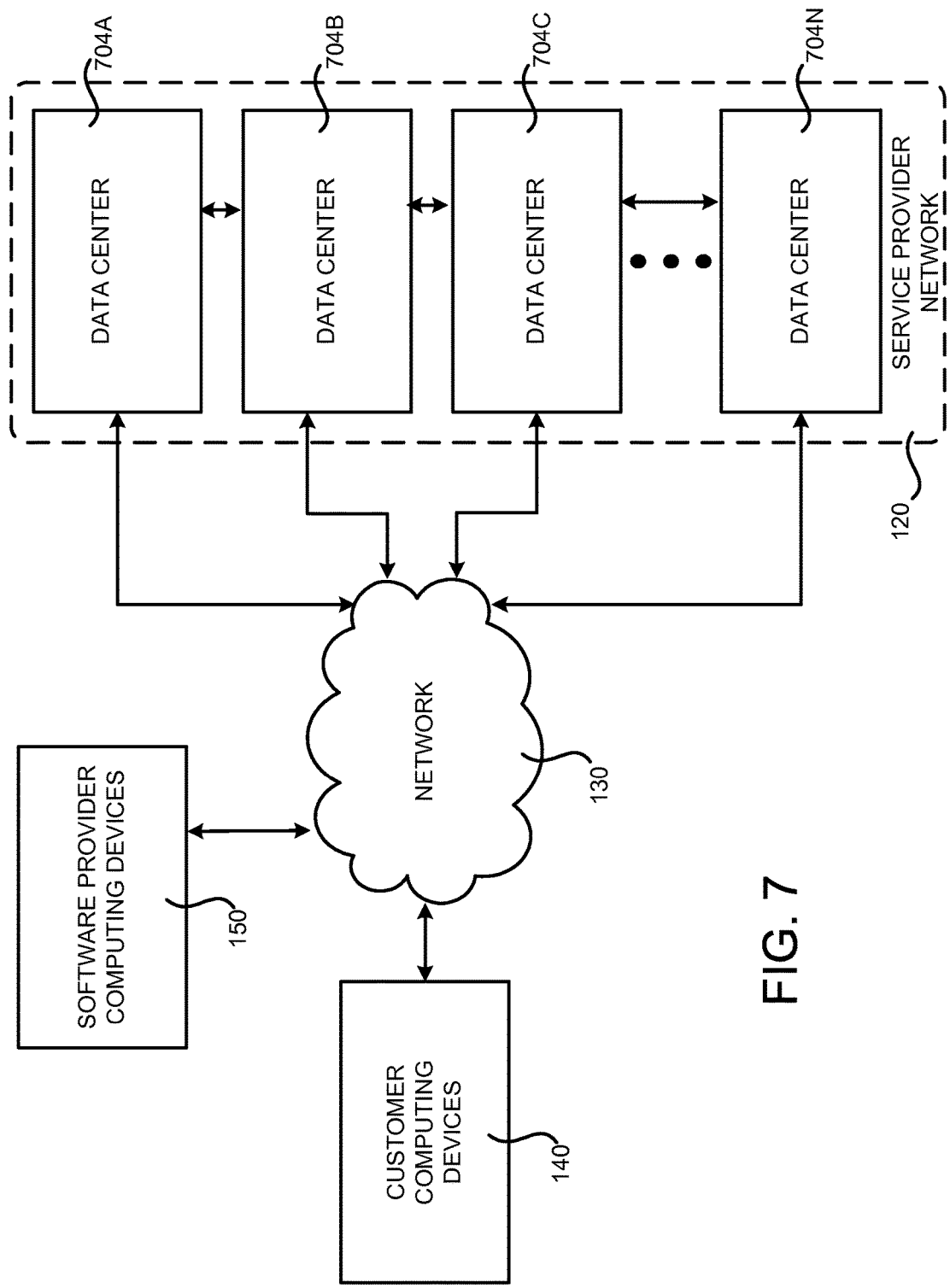
FIG. 7 is a system and network diagram that shows one illustrative operating environment for the embodiments disclosed herein that includes a service provider network.

FIG. 7 and the following description are intended to provide a brief, general description of a suitable computing environment in which the embodiments described herein may be implemented. In particular, FIG. 7 is a system and network diagram that shows an illustrative operating environment that includes a service provider network 120. As discussed above, the service provider network 120 can provide virtual machine instances and other types of computing resources on a permanent or an as-needed basis.

The computing resources provided by the service provider network 120 may include various types of resources, such as data processing resources, data storage resources, networking resources, data communication resources and the like. Each type of computing resource may be general-purpose or may be available in a number of specific configurations. For example, and as will be described in greater detail below, data processing resources may be available as virtual machine instances in a number of different configurations. The virtual machine instances may be configured to execute applications, including Web servers, application servers, media servers, database servers and other types of applications. Data storage resources may include file storage devices, block storage devices and the like. Each type or configuration of a virtual machine instance of a computing resource may be available in different sizes, such as large resources, consisting of many processors, large amounts of memory, and/or large storage capacity, and small resources consisting of fewer processors, smaller amounts of memory and/or smaller storage capacity.

The computing resources provided by the service provider network 120 are enabled in one implementation by one or more data centers 704A-704N (which may be referred to herein singularly as "a data center 704" or collectively as "the data centers 704"). The data centers 704 are facilities utilized to house and operate computer systems and associated components. The data centers 704 typically include redundant and backup power, communications, cooling and security systems. The data centers 704 might also be located in geographically disparate locations. One illustrative configuration for a data center 704 that implements some or all of the concepts and technologies disclosed herein for annotating resources in the service provider network 120 will be described below with regard to FIG. 8.

The users and customers of the service provider network 120 may access the computing resources provided by the data centers 704 over a suitable data communications network, such as a Wide Area Network ("WAN"), as illustrated by the network 130. Although a WAN might be used, it should be appreciated that a local-area network ("LAN"), the Internet, or any other networking topology known in the art that connects the data centers 704 to the customer computing devices 140, or the software provider computing devices 150 may be utilized. It should also be appreciated that combinations of such networks might also be utilized.

Figure 8:
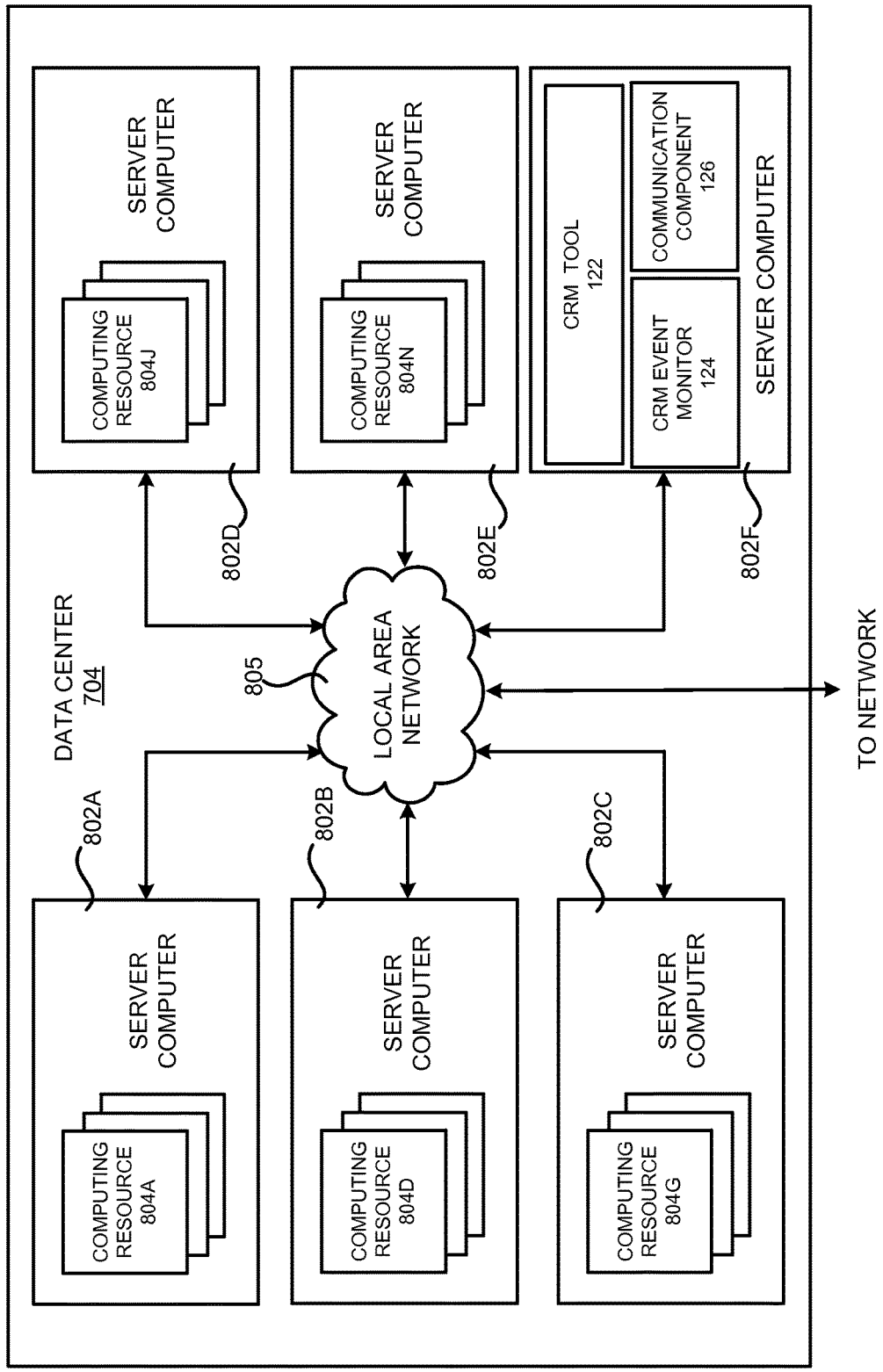
FIG. 8 is a computing system diagram that illustrates one configuration for a data center that implements aspects of a service provider network, including some or all of the concepts and technologies disclosed herein for sending messages specified by a third party to customers of an electronic marketplace while maintaining customer privacy.

FIG. 8 is a computing system diagram that illustrates one configuration for a data center 704 that implements aspects of a service provider network 120, including some or all of the concepts and technologies disclosed herein for sending messages specified by a third party to customers of an electronic marketplace 160 while maintaining customer privacy. The example data center 704 shown in FIG. 8 includes several server computers 802A-802F (which may be referred to herein singularly as "a server computer 802" or in the plural as "the server computers 802") for providing computing resources. The server computers 802 may be standard tower or rack-mount server computers configured appropriately for providing the computing resources described herein. According to an embodiment, the server computers 802 are configured to execute the software products as described above.

In one embodiment, some of the computing resources 804 are virtual machine instances. As known in the art, a virtual machine instance is an instance of a software implementation of a machine (i.e. a computer) that executes programs like a physical machine. Each of the server computers 802 may be configured to execute a manager (not shown) capable of instantiating and managing computing resources and virtual machine instances. In the case of virtual machine instances, for example, the manager might be a hypervisor or another type of program configured to enable the execution of multiple virtual machine instances on a single server computer 802, for example.

It should be appreciated that although the embodiments disclosed herein are described primarily in the context of virtual machine instances, other types computing resources can be utilized with the concepts and technologies disclosed herein. For instance, the technologies disclosed herein might be utilized with hardware resources, data storage resources, data communications resources, networking resources, database resources and with other types of computing resources.

The data center 704 shown in FIG. 8 also includes a server computer 802F reserved for executing software components for managing the operation of the data center 704, the server computers 802, virtual machine instances, and other resources within the service provider network 120. The server computer 802F might also execute the CRM tool 122, the CRM event monitor 124 and the communication component 126. Details regarding the operation of each of these components has been provided above. In this regard, it should be appreciated that while these components are illustrated as executing within the service provider network 120, computing systems that are external to the service provider network 120 might also be utilized to execute some or all of these components. Other configurations might also be utilized.

In the example data center 704 shown in FIG. 8, an appropriate local area network ("LAN") 805 is utilized to interconnect the server computers 802A-802E and the server computer 802F. The LAN 805 is also connected to the network 130 illustrated in FIG. 7. It should be appreciated that the configuration and network topology illustrated in FIGS. 7 and 8 has been greatly simplified and that many more computing systems, networks and networking devices may be utilized to interconnect the various computing systems disclosed herein. Appropriate load balancing devices or software modules might also be utilized for balancing a load between each of the data centers 804A-804N, between each of the server computers 802A-802F in each data center 704 and between virtual machine instances and other types of computing resources provided by the service provider network 120.

It should be appreciated that the data center 704 described in FIG. 8 is merely illustrative and that other implementations might also be utilized. Additionally, it should be appreciated that the functionality provided by these components might be implemented in software, hardware, or a combination of software and hardware. Other implementations should be apparent to those skilled in the art.

Figure 9:
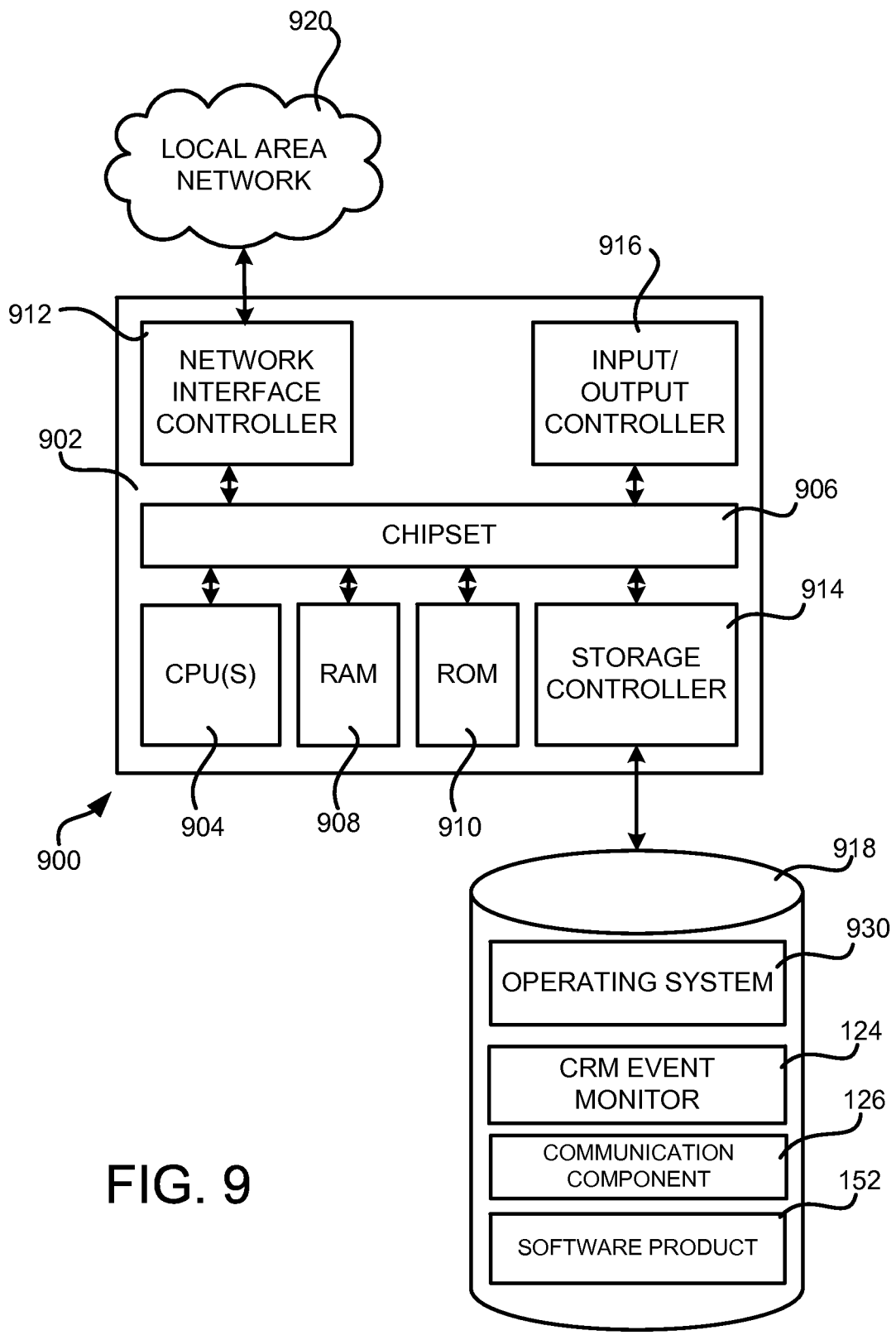
FIG. 9 is a computer architecture diagram showing one illustrative computer hardware architecture for implementing a computing device that might be utilized to implement aspects of the various embodiments presented herein.

FIG. 9 shows an example computer architecture for a computer 900 capable of executing program components for sending messages specified by a third party to customers of an electronic marketplace while maintaining customer privacy in the manner described above. The computer architecture shown in FIG. 9 illustrates a conventional server computer, workstation, desktop computer, laptop, tablet, network appliance, personal digital assistant ("PDA"), e-reader, digital cellular phone, or other computing device, and may be utilized to execute any of the software components presented herein. For example, the computer architecture shown in FIG. 9 may be utilized to execute software components for performing operations as described above. The computer architecture shown in FIG. 9 might also be utilized to implement a customer computing device 140, a software provider computing device 150 or any other of the computing systems described herein.

The computer 900 includes a baseboard 902, or "motherboard," which is a printed circuit board to which a multitude of components or devices may be connected by way of a system bus or other electrical communication paths. In one illustrative embodiment, one or more central processing units ("CPUs") 904 operate in conjunction with a chipset 906. The CPUs 904 may be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

The chipset 906 provides an interface between the CPUs 904 and the remainder of the components and devices on the baseboard 902. The chipset 906 may provide an interface to a RAM 908, used as the main memory in the computer 900. The chipset 906 may further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM may also store other software components necessary for the operation of the computer 900 in accordance with the embodiments described herein.

The computer 900 may operate in a networked environment using logical connections to remote computing devices and computer systems through a network, such as the local area network 920. The chipset 906 may include functionality for providing network connectivity through a network interface controller ("NIC") 912, such as a gigabit Ethernet adapter. The NIC 912 is capable of connecting the computer 900 to other computing devices over the local area network 920. It should be appreciated that multiple NICs 912 may be present in the computer 900, connecting the computer to other types of networks and remote computer systems.

The computer 900 may be connected to a mass storage device 918 that provides non-volatile storage for the computer. The mass storage device 918 may store system programs, application programs, other program modules and data, which have been described in greater detail herein. The mass storage device 918 may be connected to the computer 900 through a storage controller 914 connected to the chipset 906. The mass storage device 918 may consist of one or more physical storage units. The storage controller 914 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 may store data on the mass storage device 918 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 918 is characterized as primary or secondary storage and the like.

For example, the computer 900 may store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 may further read information from the mass storage device 918 by detecting the physical states or characteristics of one or more particular locations within the physical storage units.

In addition to the mass storage device 918 described above, the computer 900 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 900.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 918 may store an operating system 930 utilized to control the operation of the computer 900. According to one embodiment, the operating system comprises the LINUX operating system. According to another embodiment, the operating system comprises the WINDOWS® SERVER operating system from MICROSOFT Corporation. According to further embodiments, the operating system may comprise the UNIX operating system. It should be appreciated that other operating systems may also be utilized. The mass storage device 918 may store other system or application programs and data utilized by the computer 900, such as components that include the CRM event monitor 124, the communication component 126, software product 152 and/or any of the other software components and data described above. The mass storage device 918 might also store other programs and data not specifically identified herein.

In one embodiment, the mass storage device 918 or other computer-readable storage media is encoded with computer-executable instructions which, when loaded into the computer 900, transform the computer from a general-purpose computing system into a special-purpose computer capable of implementing the embodiments described herein. These computer-executable instructions transform the computer 900 by specifying how the CPUs 904 transition between states, as described above. According to one embodiment, the computer 900 has access to computer-readable storage media storing computer-executable instructions which, when executed by the computer 900, perform the various routines described above with regard to FIGS. 4-6. The computer 900 might also include computer-readable storage media for performing any of the other computer-implemented operations described herein.

The computer 900 may also include one or more input/output controllers 916 for receiving and processing input from a number of input devices, such as a keyboard, a mouse, a touchpad, a touch screen, an electronic stylus, or other type of input device. Similarly, the input/output controller 916 may provide output to a display, such as a computer monitor, a flat-panel display, a digital projector, a printer, a plotter, or other type of output device. It will be appreciated that the computer 900 may not include all of the components shown in FIG. 9, may include other components that are not explicitly shown in FIG. 9, or may utilize an architecture completely different than that shown in FIG. 9.

Based on the foregoing, it should be appreciated that technologies for sending messages specified by a third party to customers of an electronic marketplace in response to detecting a CRM event while maintaining customer privacy have been presented herein. Moreover, although the subject matter presented herein has been described in language specific to computer structural features, methodological acts and computer readable media, it is to be understood that the invention defined in the appended claims is not necessarily limited to the specific features, acts, or media described herein. Rather, the specific features, acts and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A non-transitory computer-readable storage medium having computer-executable instructions stored thereupon which, when executed by a computer, cause the computer to:
    receive, from a computing device associated with a software provider that submitted a software product to an electronic marketplace, CRM event data identifying a CRM event to monitor and content of a message associated with the CRM event, wherein the CRM event is one or more of a new customer event associated with a new customer acquiring a right to use the software product, a usage event indicating one or more of a usage data indicates a usage of the software product is below a first threshold and the usage data indicates the usage of the software product is above a second threshold, or a configuration event associated with one or more incorrect configuration settings associated with the software product;
    monitor the usage of the software product via one or more computers of a service provider network;
    generate the usage data of the software product via one or more computers of the service provider network based, at least in part, on the monitoring;
    access, from a memory of the service provider network, information relating to the software product, the information including the CRM event data, customer information associated with customers of the service provider network utilizing the software product, and the usage data for the software product, wherein at least a portion of the information is generated via one or more computers associated with one or more of the electronic marketplace and the service provider network;
    detect, based at least in part on a programmatic analysis of the information by one or more computers of the service provider network, an occurrence of the CRM event;
    access a message that is associated with the CRM event, wherein the software provider defines at least a portion of content of the message;
    identify one or more customers of the electronic marketplace to receive the message;
    provide, on behalf of the software provider, the message to the one or more customers of the electronic marketplace;
    track one or more actions by at least a portion of the customers of the electronic marketplace relating to the message;
    and provide analytics from the electronic marketplace to a third party associated with the software provider that includes information relating to an effectiveness of the message and includes anonymized customer information.

2. The non-transitory computer-readable storage medium of claim 1, wherein the CRM event is one or more of the new customer event, an upgrade event, the usage event, or the configuration event.

3. The non-transitory computer-readable storage medium of claim 1, wherein the usage data comprises an amount of time the software product has been executed on one or more computers of the service provider network, wherein the service provider network is associated with the electronic marketplace.

4. The non-transitory computer-readable storage medium of claim 1, further comprising accessing settings used to execute the software product on the service provider network to generate the configuration information.

5. The non-transitory computer-readable storage medium of claim 1, having further computer executable instructions stored thereupon to receive options that define one or more settings relating to the CRM event.

6. A system, comprising:
    one or more computer systems associated with a service provider network configured to
        monitor usage of a software product;
        generate usage data of the software product based, at least in part, on the monitoring; and
    a CRM computing device coupled to the one or more computer systems operative to
        detect an occurrence of a customer relationship management (CRM) event related to the software product, wherein the CRM event is one or more of a new customer event associated with a new customer acquiring a right to use the software product, a usage event indicating one or more of the usage data indicates a usage of the software product is below a first threshold and the usage data indicates the usage of the software product is above a second threshold, or a configuration event associated with one or more incorrect configuration settings associated with the software product,
        at least partly in response to detecting the occurrence of the event, identify one or more of the customers of an electronic marketplace to receive a message that includes content received from a computing device associated with a third party software provider, and cause the message to be provided the one or more customers.

7. The system of claim 6, wherein the usage data comprises configuration information that indicates configuration settings for at least a portion of the software products.

8. The system of claim 6, wherein the software product is configured to execute on the service provider network.

9. The system of claim 6, wherein the CRM computing device is further operative to provide a CRM tool that provides user interface elements operative to receive settings relating to a configuration of the CRM event and the message.

10. The system of claim 6, wherein the CRM computing device is further operative to track actions of at least a portion of the customers that occur on the electronic marketplace that relate to the message.

11. The system of claim 10, wherein the actions comprise one or more of an upgrade to the software product, an update to a configuration of the software product, or an access to help for the software product.

12. The system of claim 6, wherein the CRM computing device is further operative to provide analytics to the third party software provider that relate to an effectiveness of the message.

13. The system of claim 12, wherein the analytics are anonymized to remove personally identifiable information from the customer information.

14. The system of claim 6, wherein the CRM event further comprises a custom event.

15. The system of claim 6, wherein the usage data comprises one or more of a type of virtual machine instance utilized to execute the software products, a number of virtual machine instances utilized to execute the software products, or one or more types of computing resources used to execute the software products.

16. A computer-implemented method to communicate with customers of an electronic marketplace while maintaining customer privacy, the method comprising performing computer-implemented operations for:
monitoring usage of a software product via one or more computers of a service provider network;
generating usage data of the software product via one or more computers of the service provider network based, at least in part, on the monitoring;
detecting an occurrence of a customer relationship management (CRM) event that relates to the software product provided by a third party software provider via one or more computers of the service provider network, wherein the CRM event is one or more of a new customer event associated with a new customer acquiring a right to use the software product, a usage event indicating one or more of the usage data indicates a usage of the software product is below a first threshold and the usage data indicates the usage of the software product is above a second threshold, or a configuration event associated with one or more incorrect configuration settings associated with the software product, in response to detecting the occurrence of the CRM event, creating a message that includes content received from the third party software provider, identifying one or more customers of the electronic marketplace to receive the message based at least in part on information stored by the electronic marketplace, and providing the message to the one or more customers of the electronic marketplace.

17. The computer-implemented method of claim 16, wherein the usage data comprises an amount of time the software product has been executed on one or more computers of the service provider network.

18. The computer-implemented method of claim 16, further comprising:
tracking one or more actions relating to the message; and
providing analytics that include anonymized customer information that relates to an effectiveness of the message.

19. The computer-implemented method of claim 16, further comprising providing a user interface that provides options to configure the CRM event and the message.

20. The computer-implemented method of claim 16, further comprising accessing information relating to the software product, the information including customer information, usage information and configuration information for the software product that specifies settings used when executing the software product on the service provider network.

* * * * *